United States Patent

Choi et al.

(10) Patent No.: US 8,120,840 B1
(45) Date of Patent: Feb. 21, 2012

(54) ELECTRORHEOLOGICAL FLUID HAVING PROPERTIES OF NEWTONIAN FLUID

(75) Inventors: Hyoung-Jin Choi, Seoul (KR);
Ying-Dan Liu, Incheon-si (KR); Bo-Mi Lee, Seoul (KR); Tae-Sang Park, Suwon-si (KR)

(73) Assignees: Inha-Industry Partnership Institute, Incheon-Si (KR); Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/117,519

(22) Filed: May 27, 2011

(30) Foreign Application Priority Data

Nov. 23, 2010 (KR) .................. 10-2010-0117047

(51) Int. Cl.
*G02B 26/00* (2006.01)
*H01B 3/24* (2006.01)

(52) U.S. Cl. ......... 359/296; 252/62.52; 252/73; 252/74; 252/75; 252/77; 252/500; 252/570; 252/572; 252/573; 345/107

(58) Field of Classification Search ............... 252/62.52, 252/73–75, 77, 500, 570, 572, 573; 359/296; 345/107
See application file for complete search history.

(56) References Cited

U.S. PATENT DOCUMENTS

| 4,645,614 | A | | 2/1987 | Goossens et al. |
| 4,702,855 | A | | 10/1987 | Goossens et al. |
| 5,507,967 | A | * | 4/1996 | Fujita et al. ..................... 252/74 |
| 6,645,403 | B1 | * | 11/2003 | Park et al. ..................... 252/570 |
| 6,852,251 | B2 | | 2/2005 | Sheng et al. |
| 2005/0285085 | A1 | | 12/2005 | Wen et al. |

FOREIGN PATENT DOCUMENTS

| JP | 01-197595 A | 8/1989 |
| JP | 05-140581 A | 6/1993 |
| JP | 09-176676 A | 7/1997 |
| JP | 2004-131724 A | 4/2004 |
| KR | 1992-0001052 B1 | 2/1992 |
| KR | 1994-0008392 B1 | 9/1994 |

* cited by examiner

*Primary Examiner* — Evelyn A. Lester
(74) *Attorney, Agent, or Firm* — Sughrue Mion, PLLC (57) ABSTRACT

An electrorheological fluid is provided. The electrorheological fluid includes polarizing particles and a dispersion medium in which the polarizing particles are dispersed. The polarizing particles may include silica particles. The dispersion medium may include silicon oil. The silicon oil may be modified silicon oil including at least one functional group selected from the group consisting of a hydroxyl group (—OH group), an amine group (—NH$_2$ group), a mercapto group (—SH group), and a carboxy group (—COOH group).

15 Claims, 9 Drawing Sheets

ELECTRORHEOLOGICAL FLUID HAVING PROPERTIES OF NEWTONIAN FLUID

CROSS-REFERENCE TO RELATED APPLICATION

This application claims the benefit under 35 U.S.C. §119(a) of Korean Patent Application No. 10-2010-0117047, filed on Nov. 23, 2010, the entire disclosure of which is incorporated herein by reference for all purposes.

BACKGROUND

1. Field

The following description relates to electrorheological fluid, a method of producing the same, and electrorheological fluid applications.

2. Description of the Related Art

In general, an electrorheological fluid (ERF) is defined as a suspension or fluid composed of electrically polarizable particles dispersed in a dielectric fluid. The rheological properties of an electrorheological fluid depend on an electric field applied to the electrorheological fluid.

When an electric field is applied to an electrorheological fluid, particles dispersed in the electrorheological fluid are dielectrically polarized due to their attractive forces and aligned in a chain structure in the direction of the applied electric field. The chain structure provides resistance to fluid flow and external forces, and increases the viscosity of the electrorheological fluid.

As such, since the electrorheological fluid has an advantage of being capable of controlling its mechanical power simply by application of an electric field without having to use an additional device, the electrorheological fluid can be applied to various technical fields, such as a vehicle damper system, a shock absorber, an engine mount, a valve system for controlling a rate of flow, a positioning system, robots, actuators, etc.

Moreover, since the dispersed particles in the electrorheological fluid are aligned in the direction of an applied electric field under the influence of the electric field, the electrorheological fluid exhibits the properties of a Bingham fluid whose viscosity sharply increases. However, since the properties of a Bingham fluid exhibit a very complicated mechanism, its correct arithmetic model has not yet been established.

SUMMARY

According to an aspect of an embodiment, there is provided an electrorheological fluid including: polarizing particles including silica particles; and a dispersion medium in which the polarizing particles are dispersed, the dispersion medium including silicon oil having at least one functional group selected from the group consisting of a hydroxyl group (—OH group), an amine group (—NH2 group), a mercapto group (—SH group), and a carboxy group (—COOH group).

According to an aspect of another embodiment, there is provided a method of producing electrorheological fluid, including: producing polarizing particles including silica particles; producing a dispersion medium including silicon oil having at least one functional group selected from the group consisting of a hydroxyl group (—OH group), an amine group (—NH$_2$ group), a mercapto group (—SH group), and a carboxy group (—COOH group); and dispersing the polarizing particles in the dispersion medium.

According to an aspect of another embodiment, there is provided a display including: a first electrode; a second electrode facing the first electrode; and electrorheological fluid filled in a gap between the first electrode and the second electrode, wherein the electrorheological fluid includes: polarizing particles including silica particles; and dispersion medium in which the polarizing particles are dispersed, wherein the dispersion medium including silicon oil having at least one functional group selected from the group consisting of a hydroxyl group (—OH group), an amine group (—NH$_2$ group), a mercapto group (—SH group), and a carboxy group (—COOH group).

BRIEF DESCRIPTION OF THE DRAWINGS

The above and/or other aspects of the present invention will be more apparent by describing certain embodiments with reference to the accompanying drawings, in which.

DETAILED DESCRIPTION

Certain embodiments will now be described in greater detail with reference to the accompanying drawings. The following description provides a comprehensive understanding of the embodiments described herein. Accordingly, various changes, modifications, and equivalents of the embodiments described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

Figure 1:
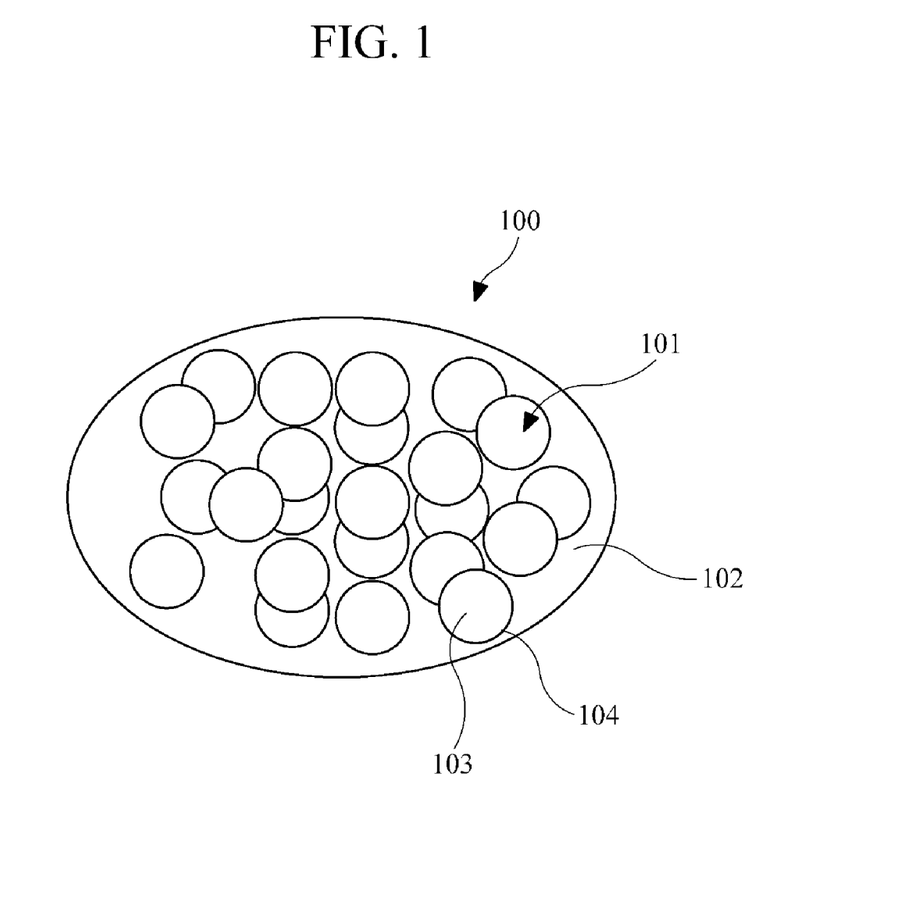
FIG. 1 illustrates an example of electrorheological fluid.

FIG. 1 illustrates an example of electrorheological fluid 100.

Referring to FIG. 1, the electrorheological fluid 100 includes polarizing particles 101 and a dispersion medium 102 in which the polarizing particles 101 are dispersed.

The polarizing particles 101 may be electrically polarizable minute particles. The polarizing particles 101 may be silica particles 103 or silica particles 103 coated with a polarizing organic material 104.

The silica particles 103 each may have the size of about 5 nm to about 20 μm, and be made with amorphous silica without pores.

The polarizing organic material 104 that can be coated on the silica particles 103 is physically/chemically coupled with the silica particles 103 so as to enhance the polarizability of the silica particles 103. According to the current example, the polarizing organic material 104 may be a material with high molecular polarization. Examples of materials with high molecular polarization include urea, thiourea, melamine, acrylamide, and molecules containing urea, thiourea, melamine, or acrylamide.

The polarizing particles 101 are dispersed in the dispersion medium 102. According to the current example, the dispersion medium 102 may include silicon oil belonging to at least one group among a hydroxyl group (—OH group), an amine group (—$NH_2$ group), a mercapto group (—SH group), and a carboxy group (—COOH group).

Here, the functional group, such as the hydroxyl group, the amine group, the mercapto group, and the carboxy group, may be coupled to the ends or sides of silicon oil molecules with or without any other organic group.

FIGS. 2A through 2D show exemplary molecular structures of the silicon oil included in the dispersion medium 102 of FIG. 1.

Referring to FIGS. 2A through 2D, the dispersion medium 102 may be silicon oil obtained by coupling pure silicon oil (for example, dimethyl silicon oil) with at least one among the hydroxyl group, the amine group, the mercapto group, and the carboxy group.

Figure 2A:
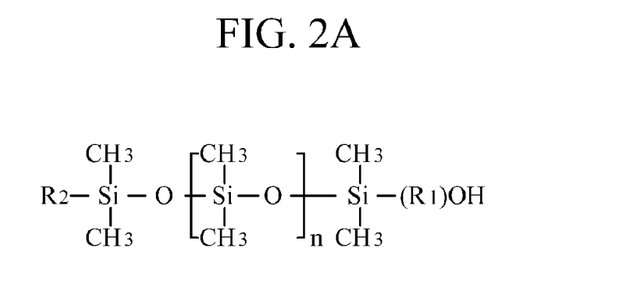
FIGS. 2A through 2D show exemplary molecular structures of silicon oil included in a dispersion medium.
Figure 2B:
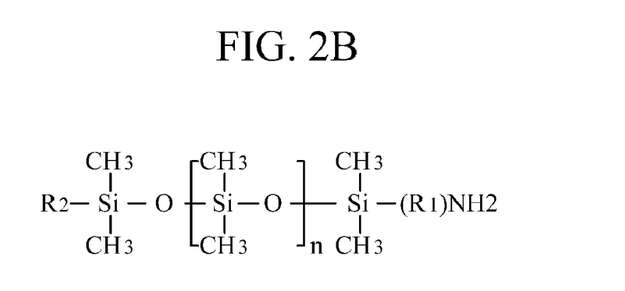
Figure 2C:
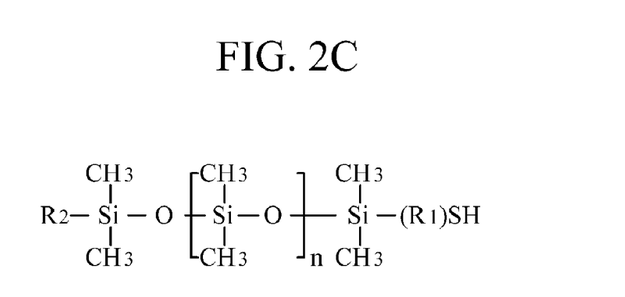
Figure 2D:
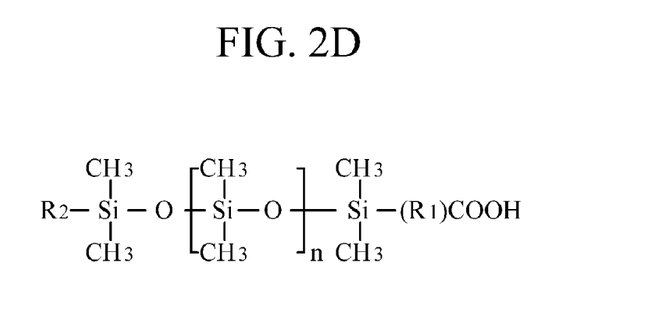
Figure 3A:
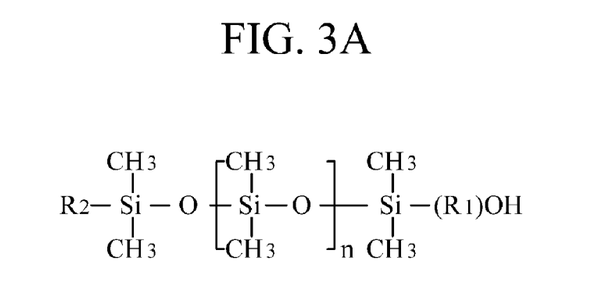
FIGS. 3A through 3F show another exemplary molecular structures of silicon oil included in a dispersion medium.
Figure 3B:
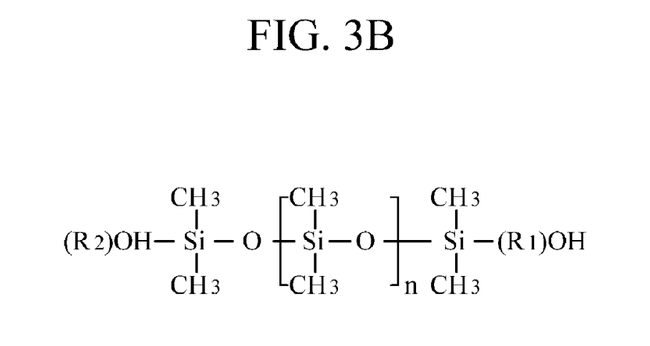
Figure 3C:
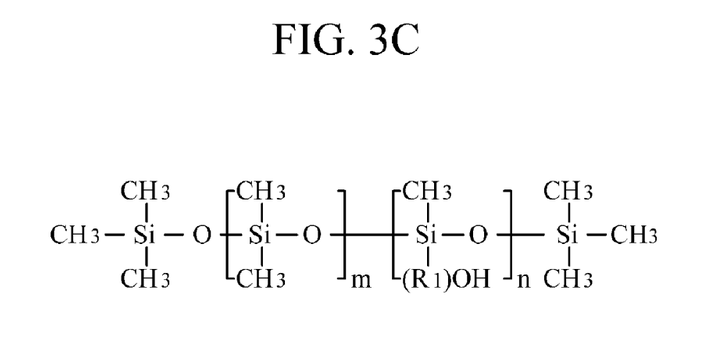
Figure 3D:
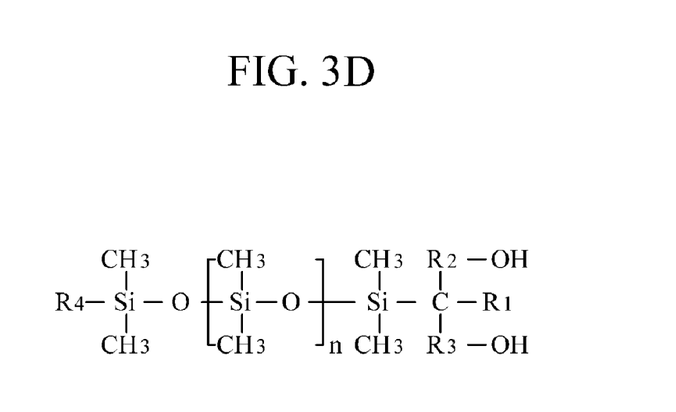
Figure 3E:
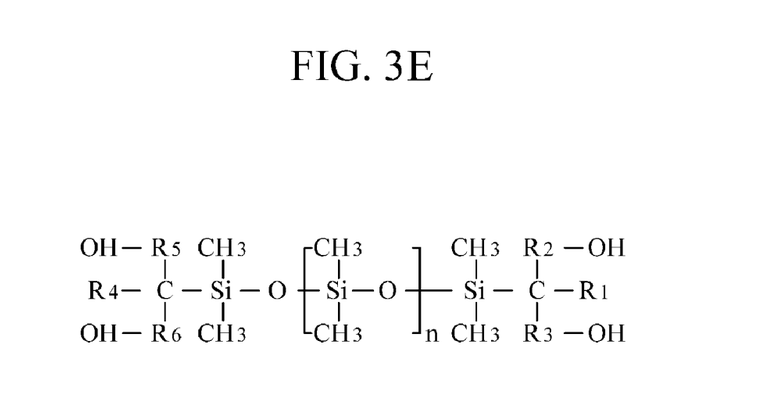
Figure 3F:
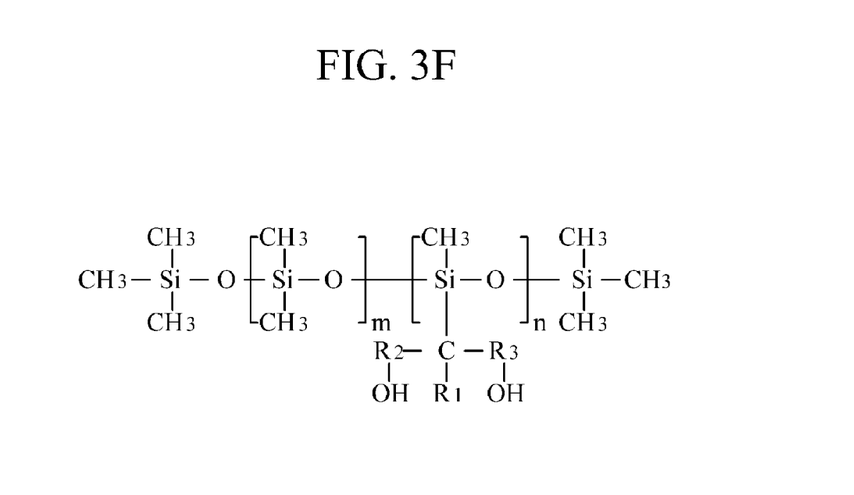

For example, FIG. 2A shows a molecular structure of silicon oil having the hydroxyl group (—OH group), FIG. 2B shows a molecular structure of silicon oil having the amine group (—$NH_2$ group), FIG. 2C shows a molecular structure of silicon oil having the mercapto group (—SH group), and FIG. 2D shows a molecular structure of silicon oil having the carboxy group (—COOH group).

In FIGS. 2A through 2D, $R_1$ and $R_2$ represent organic groups. The hydroxyl, amine, mercapto, and carboxy groups are coupled with the organic groups and then coupled with the corresponding molecular structures, or directly coupled with the molecular structures without being coupled with any organic group.

For example, the hydroxyl group may be coupled with the organic group $R_1$ to form a carbinol functional group, or may form a silanol function group without being coupled with the organic group $R_1$.

FIGS. 3A through 3F show additional exemplary molecular structures of the silicon oil included in the dispersion medium 102. FIGS. 3A through 3F show examples of coupling positions at which the hydroxyl group is coupled with the silicon oil.

Referring to FIGS. 3A through 3F, the hydroxyl group may be coupled with the end or side of the molecular structure of pure silicon oil. Also, the hydroxyl group may be coupled with a predetermined organic group and then coupled with the molecular structure, or directly coupled with the molecular structure without being coupled with any organic group. In FIGS. 3A through 3F, $R_1$ through $R_6$ represent the same or different organic groups.

Referring again to FIG. 1, according to an example, the polarizing particles 101 included in the electrorheological fluid 100 may have a volume fraction reaching about 5% through about 70% of the electrorheological fluid 100. The volume fraction of the polarizing particles 101 with respect to the total volume of the electrorheological fluid 100 has been decided to appropriately maintain yield stress against initial viscosity and the electric field.

Also, according to another example, the refractive index of the polarizing particles 101 may be similar to that of the dispersion medium 102. For example, the difference in refractive index between the polarizing particles 101 and dispersion medium 102 may be from about 0 to about 0.06. If the polarizing particles 101 are white particles and the refractive indexes of the polarizing particles 101 and dispersion medium 102 are substantially the same or similar to each other, the electrorheological fluid 100 may have transparency. Such electrorheological fluid 100 having transparency is applicable to a predetermined display device.

The dispersion medium 102 having a refractive index similar to that of the polarizing particles 101 may be produced by mixing various kinds of silicon oil and/or dielectric fluid other than silicon oil. For example, the dispersion medium 102 (for example, dispersion medium having a refractive index difference of 0.06 between the dispersion medium and polarizing particles) having a refractive index similar to that of the polarizing particles 101 may be produced by mixing silicon oil having a hydroxyl group with insulating oil.

The refractive index of the dispersion medium 102 which is produced by mixing several fluids may be calculated by the following Lorentz-Lorentz Equation:

$$\frac{n^2-1}{n^2+2} = \left(\frac{n_1^2-1}{n_1^2+2}\right)\phi_1 + \left(\frac{n_2^2-1}{n_2^2+2}\right)\phi_2,$$

where n is refractive index of oil mixture, $n_1$ is a refractive index of pure oil 1, $n_2$ is a refractive index of pure oil 2, $\phi_1$ is a volume fraction of pure oil 1 with respect to oil mixture, and $\phi_2$ is a volume fraction of pure oil 2 with respect to oil mixture.

Figure 4:
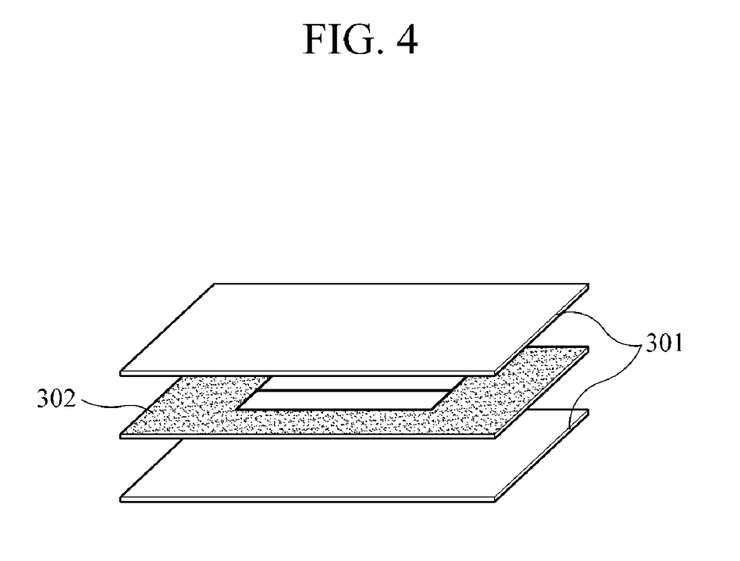
FIG. 4 is a view for explaining an example of a method of selecting a dispersion medium having a refractive index similar to that of polarizing particles.

FIG. 4 is a view for explaining an example of a method of selecting a dispersion medium having a refractive index similar to that of polarizing particles.

Referring to FIG. 4, a double sided tape 302 having the thickness of about 300 μm is used to form a space between two transparent glass plates 301 each having a thickness of about 0.7 mm. Then, the space is filled with a suspension (for example, an electrorheological fluid) for measuring transparency, which is produced by dispersing an appropriate amount of polarizing particles in a dispersion medium having a predetermined refractive index, so that transparency is visible to the naked eye or measured through a predetermined device.

For example, several suspensions are prepared by preparing dispersion media having various refractive indexes and then dispersing an appropriate amount of polarizing particles in each dispersion medium. Then, each suspension is filled in the space illustrated in FIG. 4, and then transparency with respect to light having the wavelength of about 550 nm is measured using Lambda-900 UVNis/NIR Spectrometer manufactured by Perkin Elmer Corporation. In this case, a dispersion medium included in the suspension having transparency of about 90% may be determined to have a refractive index similar to that of polarizing particles, and the dispersion medium may be selected.

Figure 5:
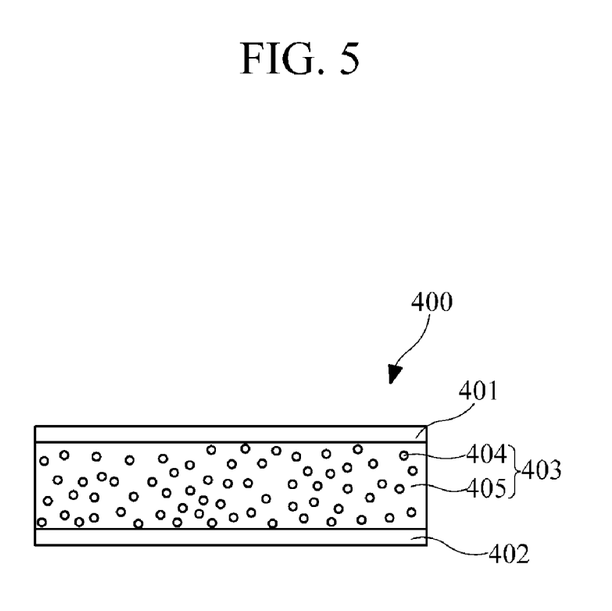
FIG. 5 illustrates a display including an example of electrorheological fluid.

FIG. 5 illustrates a display 400 including an example of electrorheological fluid.

Referring to FIG. 5, the display 400 includes a upper electrode 401, a lower electrode 402, and electrorheological fluid 403. The upper and lower electrodes 401 and 402 face each other, and the electrorheological fluid 403 is filled and sealed in a gap between the upper and lower electrodes 401 and 402.

As illustrated in FIG. 5, the electrorheological fluid 403 includes polarizing particles 404 dispersed in a dispersion medium 405, wherein the refractive indexes of the polarizing particles 404 and dispersion medium 405 may be substantially the same. Accordingly, when an electric field is formed by the upper and lower electrodes 401 and 402, the polarizing particles 404 are aligned in the direction of the electric field in the dispersion medium 405, thereby sharply increasing the viscosity of the electrorheological fluid 403. Also, since the refractive indexes of the polarizing particles 404 and dispersion medium 405 are substantially the same, transparency of the electrorheological fluid 403 may be ensured.

Also, since the dispersion medium 405 contains silicon oil having at least one functional group selected from the group consisting of a hydroxyl group, a amine group, a mercapto group, and a carboxy group, the viscosity of the electrorheological fluid 403 may greatly depend on the existence or non-existence of an electric field. Accordingly, a user who manipulates the display 400 can get an excellent touch sensation depending on changes in viscosity of the electrorheological fluid 403.

In addition, according to an example, the display 400 may further include an input/output device (for example, a touch panel) for sensing a contact or pressure.

Figure 6A:
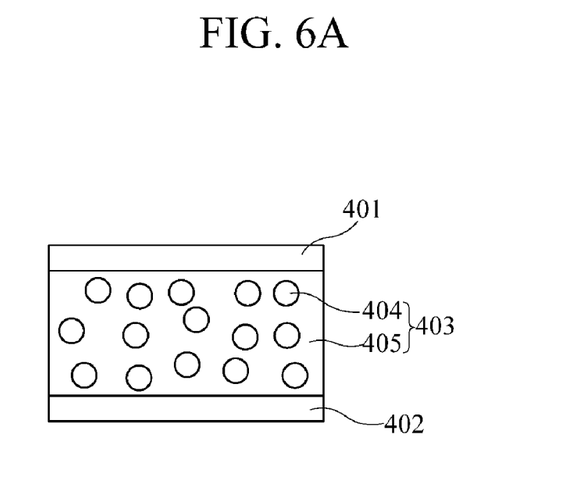
FIGS. 6A and 6B are views for explaining an operating principle of the display illustrated in FIG. 5.
Figure 6B:
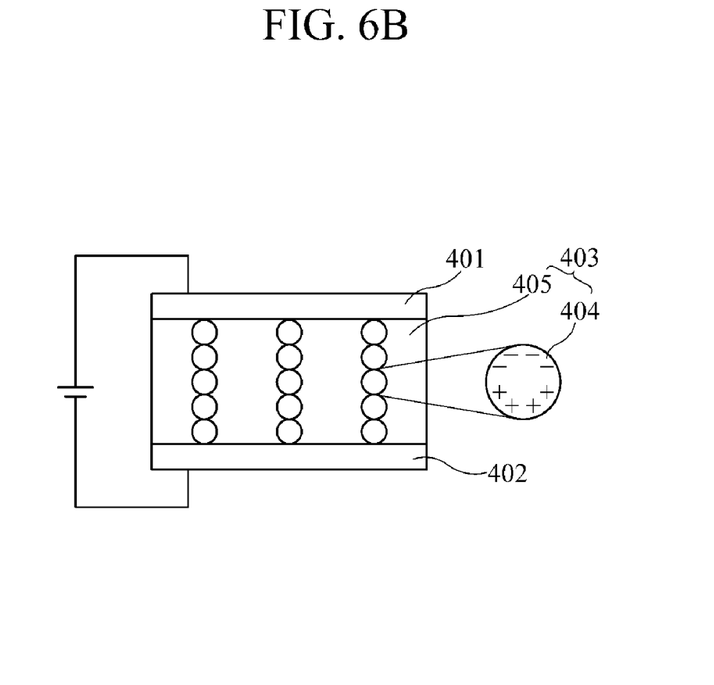

FIGS. 6A and 6B are views for explaining an operating principle of the display 400 illustrated in FIG. 5.

FIG. 6A shows a state where the polarizing particles 404 of the electrorheological fluid 403 are disorderly dispersed in the dispersion medium 405 without directivity when no electric field is applied to the electrorheological fluid 403.

FIG. 6B shows a state where when an electric field is applied to the electrorheological fluid 403, the individual polarizing particles 404 in the electrorheological fluid 403 are dielectrically polarized, and the neighboring polarizing particles 404 are aligned to a chain or column structure in the direction of the electric field between the upper and lower electrodes 401 and 402 due to attractive forces. The polarizing particles 404 aligned to the chain or column structure increases the viscosity of the electrorheological fluid 403 since the dielectrically polarized particles 404 have a restoring force by which they are again aligned to the chain or column structure just after the chain or column structure is destroyed by a certain force applied from the outside.

Figure 7A:
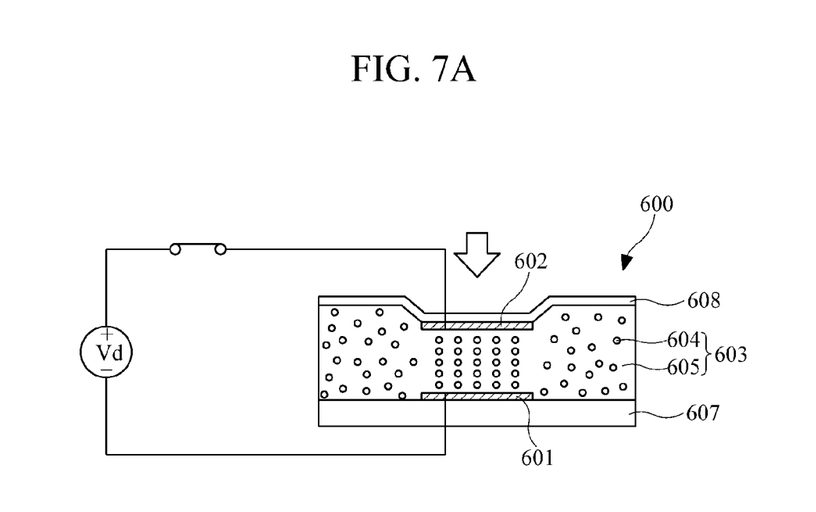
FIGS. 7A and 7B illustrate a touch panel including another example of electrorheological fluid, and an example where the touch panel operates.
Figure 7B:
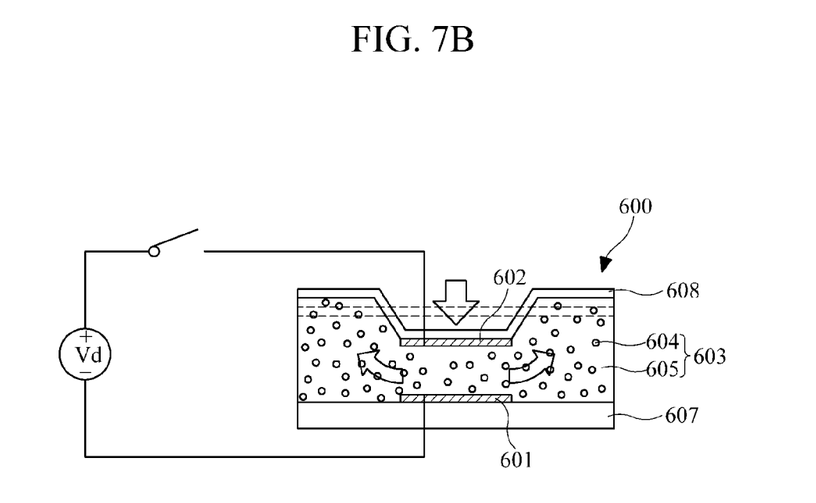

FIGS. 7A and 7B illustrate a touch panel 600 including another example of electrorheological fluid, and an example where the touch panel 600 operates.

Referring to FIGS. 7A and 7B, the touch panel 600 may include a lower electrode 601, a upper electrode 602, electrorheological fluid 603, a lower substrate 607, and a upper substrate 608, wherein the electrorheological fluid 603 may have transparency. For example, the electrorheological fluid 603 may contain polarizing particles 604 and a dispersion medium 605 having a refractive index similar to that of the polarizing particles 604. The lower electrode 601 and the upper electrode 602 are disposed on the lower substrate 607 and the upper substrate 608, respectively, and the electrorheological fluid 603 is filled and sealed in a gap between the lower substrate 607 and the upper substrate 608. Although one lower substrate 607 and the upper substrate 608 are illustrated in FIGS. 7A and 7B it will be appreciated that a plurality of opposing electrode pairs may be arranged on the lower substrate 607 and the upper substrate 608.

Referring to FIG. 7A, when voltages are applied to the upper and lower electrodes 601 and 602, the polarizing particles 604 in the electrorheological fluid 603 are aligned to a chain or column structure, thereby increasing the viscosity of the electrorheological fluid 603. In this state, when a user presses the touch panel 600 using his or her finger, a stylus pen, etc., a repulsive force caused by the high viscosity of the electrorheological fluid 603 is transferred to the user. When displacement of the upper substrate 608 reaches a predetermined thickness, information about a location at which the user's pressing occurs is transferred to a controller (not shown), and the controller releases the applied voltages.

Referring to FIG. 7B, when the applied voltages are released, the alignment of the polarizing particles 604 is broken, so that the viscosity of the electrorheological fluid 603 decreases and thus the repulsive force felt by the user decreases, thereby providing the user a with clicking sensation or a touch sensation.

Hereinafter, rheological properties between electrorheological fluid based on a dispersion medium including silicon oil having a hydroxyl group and elecrorheological fluid based on a dispersion medium including silicon oil having no hydroxyl group are compared.

[Production of Polarizing Particles]

A suspension is produced by placing silica particles (for example, Sunsil-20 produced by SUNJIN CHEMICAL Co., Ltd.) in distilled water and mechanically stirring the solution for about 1 hour. Urea (Aldrich) of 4 g is added to the suspension and then the mixture is mechanically stirred for about 16 hours at room temperature. The stirred solution is then placed into a centrifugal machine to separate distilled water from the solution, and then the resultant solution is dried for 24 hours in a vacuum oven heated to 80° C., so that white polarizing particles (for example, 101 of FIG. 1) are obtained.

[Production of First Electrorheological Fluid]

The polarizing particles are dispersed with a volume fraction of 13% in silicon oil (X-22-170DX produced by Shinetsu Chemical Co., Ltd.), so that an electrorheological fluid is produced. The X-22-170DX silicon oil, which is silicon oil having the molecular structure illustrated in FIG. 2A, includes the hydroxyl group.

[Production of Second Electrorheological Fluid]

The polarizing particles are dispersed with a volume fraction of 13% in silicon oil (KF-96 produced by Shinetsu Chemical Co., Ltd.), so that an electrorheological fluid is produced. The KF-96 silicon oil is pure silicon oil having no hydroxyl group.

Figure 8:
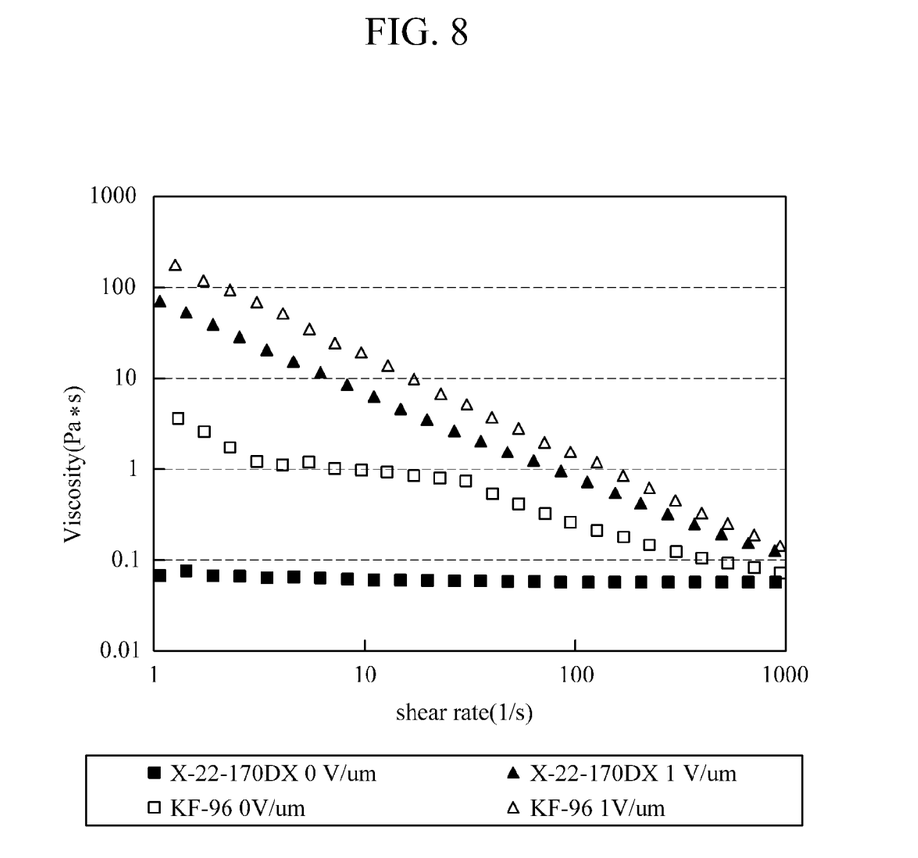
FIG. 8 is a graph illustrating comparison results of rheological properties between first and second electrorheological fluid.

FIG. 8 is a graph illustrating the comparison results of rheological properties between the first and second electrorheological fluid.

Referring to FIG. 8, when no electric field is applied, the first electrorheological fluid based on silicon oil having the hydroxyl group exhibits the properties of a Newtonian fluid whose viscosity is the substantially same at a shear rate of 1 or more, whereas the second electrorheological fluid based on pure silicon oil exhibits the properties of a Non-Newtonian fluid whose viscosity changes depending on a shear rate.

An electrorheological fluid whose viscosity change is great between when an electronic field is applied and when no electronic field is applied is preferable. In the current example, the viscosity change ratio of the first electrorheological fluid is greater than that of the second electrorheological fluid.

Hereinafter, a method of producing a transparent electrorheological fluid using the first electrorheological fluid will be described.

[Example of Producing Transparent Electrorheological Fluid]

A dispersion medium is produced by mixing two or more kinds of silicon oil having one or more hydroxyl groups or by mixing silicon oil including a hydroxyl group with two or more kinds of insulative fluid or oil. For example, dispersion media having various refractive indexes may be produced by mixing an appropriate amount of silicon oil (X-22-170DX, $n_D$=1.406, Shinetsu) having a relatively low refractive index and including a hydroxyl group with an appropriate amount of silicon oil (PDS-1615, nD=1.473, Gelest) having a relatively high refractive index.

Then, a dispersion medium having a refractive index similar to that of polarizing particles is selected. For example, by dispersing an appropriate amount of polarizing particles in each dispersion medium to produce a suspension, and measuring transparency of the suspension, the refractive index of the dispersion medium can be measured. In the current example, a suspension obtained by dispersing an appropriate amount of polarizing particles in a plurality of dispersion media having predetermined refractive indexes is referred to as a suspension for measuring transparency or as candidate electrorheological fluid. In other words, by producing a suspension for measuring transparency based on a plurality of dispersion media having different refractive indexes, and measuring the transparency of the suspension, a suitable dispersion medium may be selected.

Then, by dispersing polarizing particles in the selected dispersion medium, that is, in the dispersion medium having a refractive index similar to that of polarizing particles, an electrorheological fluid having transparency is produced. For example, polarizing particles may be dispersed in the selected dispersion medium by placing, them with a volume fraction of about 13%, into the dispersion medium, stirring the mixture, and then performing sonication on the stirred mixture.

For convenience of description, in the current example, a hydroxyl group is used as an example, however, it is also apparent that an amine group, a mercapto group, or a carboxy group can be used.

As described above, according to the above-described examples, since a dispersion medium forming an electrorheological fluid includes silicon oil having one of a hydroxyl group (—OH group), an amine group (—$NH_2$ group), and a carboxy group (—COOH group), electrorheological fluid exhibit the properties of a Newtonian fluid can be provided. Also, since the refractive index of the dispersion medium is the substantially same as that of polarizing particles, an electrorheological fluid suitable to be applied to a display can be provided.

Various embodiments and examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electrorheological fluid comprising:
   polarizing particles comprising silica particles; and
   a dispersion medium in which the polarizing particles are dispersed, the dispersion medium comprising silicon oil having at least one functional group selected from the group consisting of a hydroxyl group (—OH group), an amine group (—$NH_2$ group), a mercapto group (—SH group), and a carboxy group (—COOH group).

2. The electrorheological fluid of claim 1, wherein the at least one functional group is coupled to an end or side of a pure silicon oil molecule.

3. The electrorheological fluid of claim 2, wherein the at least one functional group is coupled is to the end or side of the pure silicon oil molecule without an organic group.

4. The electrorheological fluid of claim 2, wherein the at least one functional group is coupled is to the end or side of the pure silicon oil molecule with an organic group.

5. The electrorheological fluid of claim 3, wherein the at least one functional group is a hydroxyl group (—OH group) which forms a carbinol functional group with the organic group.

6. The electrorheological fluid of claim 4, wherein the at least one functional group is a hydroxyl group (—OH group) which forms a silanol functional group without the organic group.

7. The electrorheological fluid of claim 1, wherein the polarizing particles further comprise a polarizing organic material physically or chemically coupled to the silica particles.

8. The electrorheological fluid of claim 7, wherein the polarizing organic material comprises at least one selected from the group consisting of urea, thiourea, melamine, acrylamide, and a combination thereof.

9. The electrorheological fluid of claim 1, wherein a difference between a refractive index of the polarizing particles and a refractive index of the dispersion medium is less than 0.06.

10. A method of producing electrorheological fluid, the method comprising:
    producing polarizing particles comprising silica particles;
    producing a dispersion medium comprising silicon oil having at least one functional group selected from a group consisting of a hydroxyl group (—OH group), an amine group (—$NH_2$ group), a mercapto group (—SH group), and a carboxy group (—COOH group); and
    dispersing the polarizing particles in the dispersion medium.

11. The method of claim 10, wherein the producing the polarizing particles comprises:
    placing silica particles in distilled water and stirring the distilled water with the silica particles to produce a first suspension;
    placing a polarizing organic material in the first suspension to produce a second suspension;
    separating the distilled water from the second suspension; and
    drying the second suspension separated from the distilled water to obtain the polarizing particles.

12. The method of claim 11, wherein the polarizing organic material comprises at least one selected from the group consisting of urea, thiourea, melamine, acrylamide, and a combination thereof.

13. The method of claim 10, wherein the dispersing the polarizing particles in the dispersion medium comprises:
    producing a plurality of dispersion media having different refractive indexes; and
    selecting from the plurality of dispersion media, a dispersion medium whose refractive index is different by 0.06 from a refractive index of the polarizing particles.

14. A display comprising:
    a first electrode;
    a second electrode facing the first electrode; and
    electrorheological fluid filled in a gap between the first electrode and the second electrode, wherein the electrorheological fluid comprises:
    polarizing particles comprising silica particles; and
    a dispersion medium in which the polarizing particles are dispersed, the dispersion medium comprising silicon oil having at least one functional group selected from the group consisting of among a hydroxyl group (—OH group), an amine group (—$NH_2$ group), a mercapto group (—SH group), and a carboxy group (—COOH group).

15. The display of claim 14, wherein a difference between a refractive index of the polarizing particles and a refractive index of the dispersion medium is less than 0.06.

* * * * *